Jan. 12, 1960 A. E. LOMAS 2,920,492
VARIABLE SPEED -V- PULLEYS
Filed Jan. 14, 1957 4 Sheets-Sheet 1
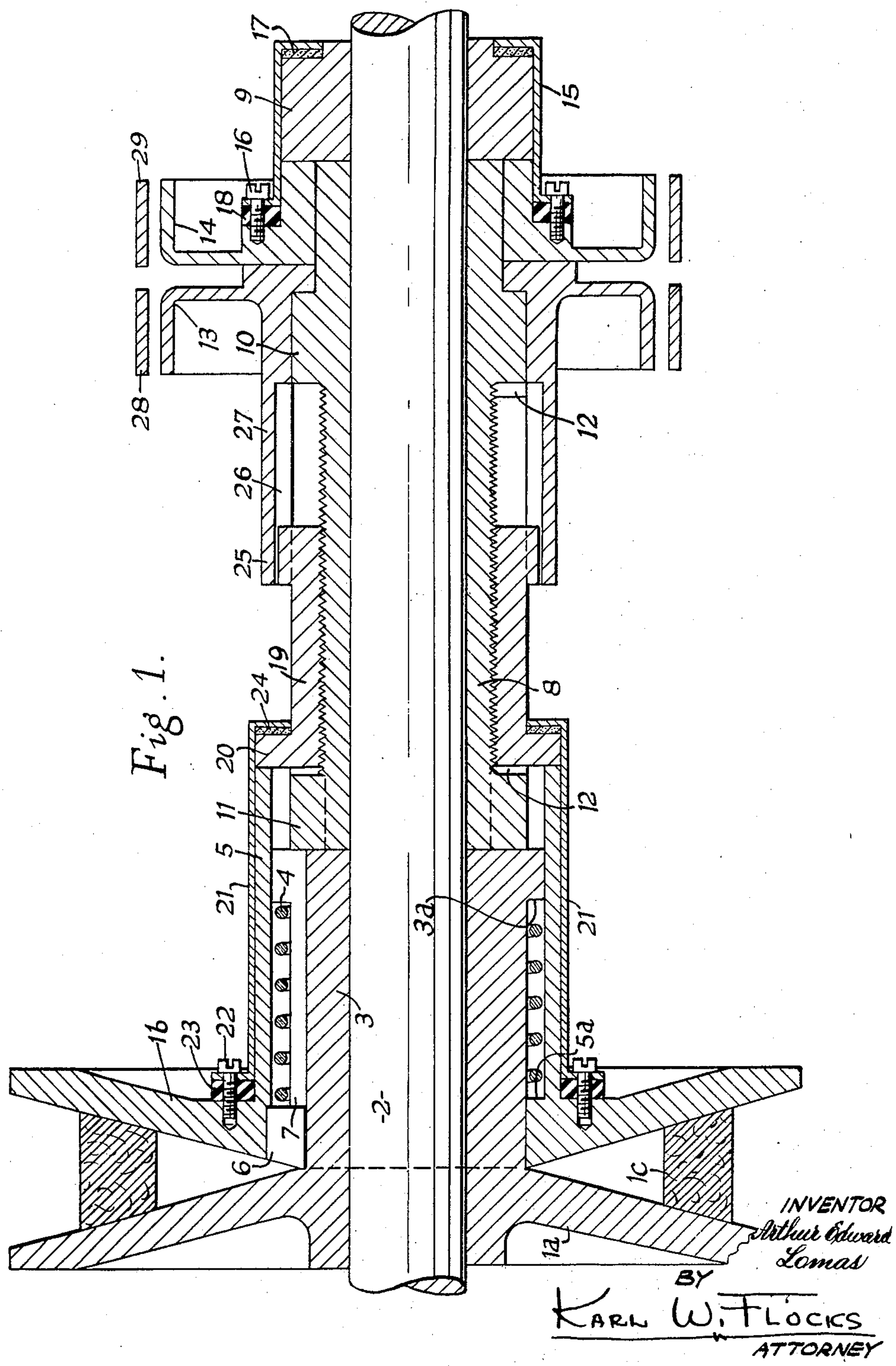

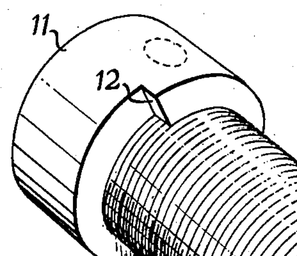
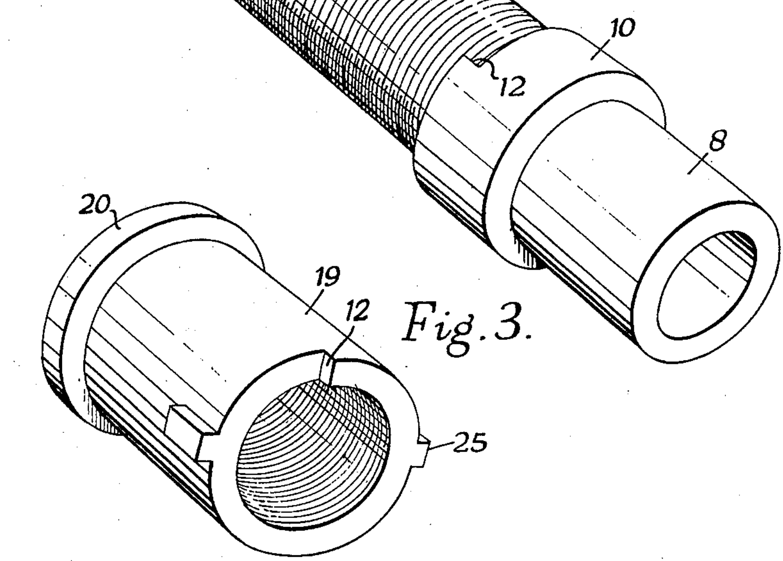
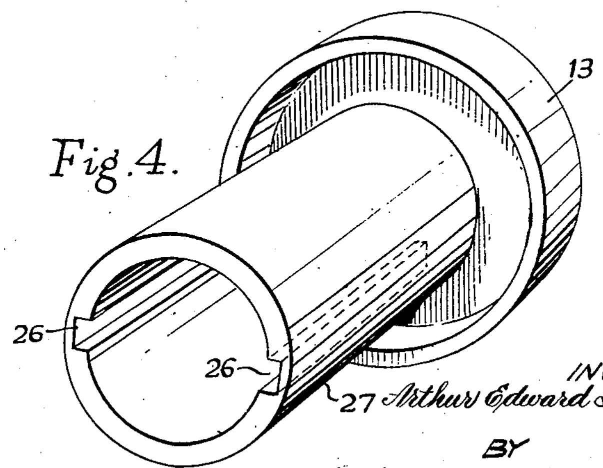
INVENTOR
27 Arthur Edward Lomas
BY
Karl W. Flocks
ATTORNEY Jan. 12, 1960 A. E. LOMAS 2,920,492
VARIABLE SPEED -V- PULLEYS
Filed Jan. 14, 1957 4 Sheets-Sheet 3
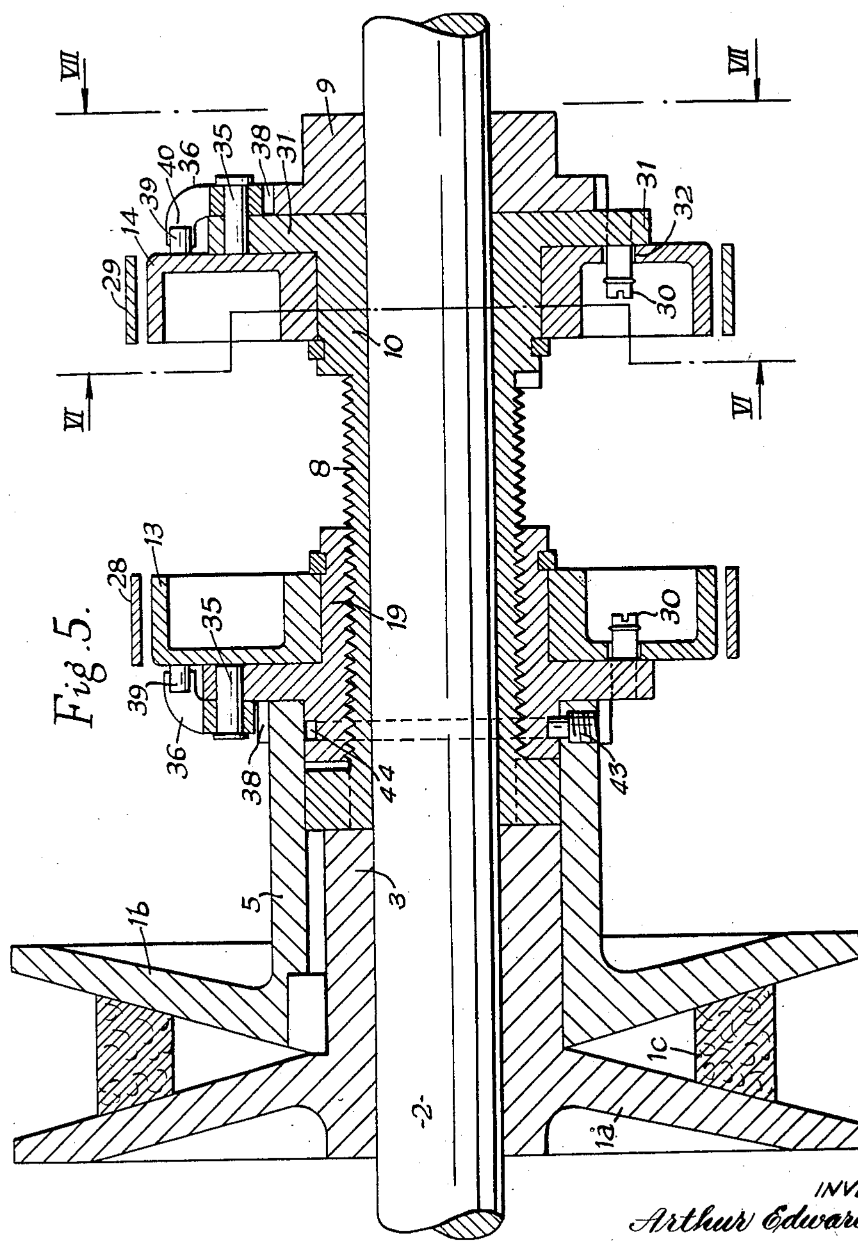
INVENTOR
Arthur Edward Lomas
BY
Karl W. Flocks
ATTORNEY

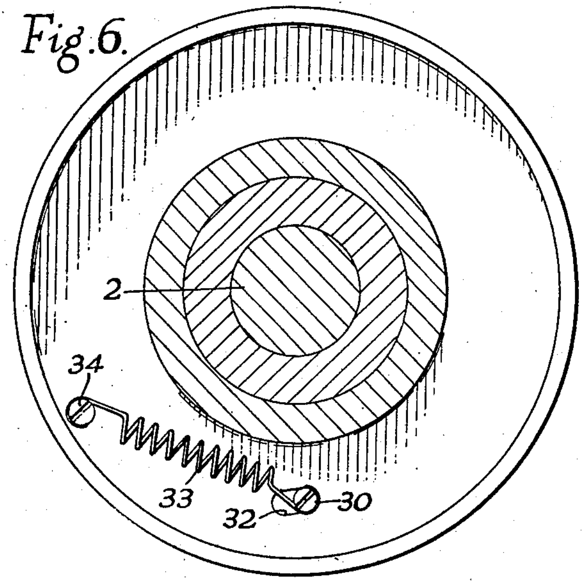
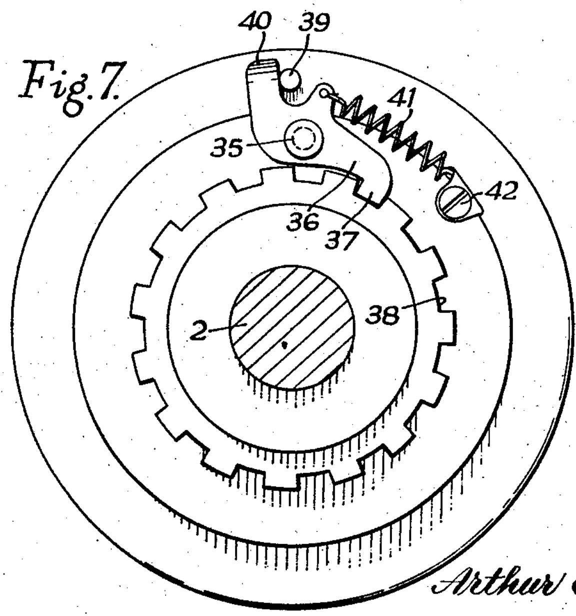
INVENTOR
Arthur Edward Lomas
BY
Karl W. Flocks
ATTORNEY

United States Patent Office 2,920,492

Patented Jan. 12, 1960

2,920,492

VARIABLE SPEED-V-PULLEYS

Arthur E. Lomas, Southport, England

Application January 14, 1957, Serial No. 634,077

Claims priority, application Great Britain January 13, 1956

4 Claims. (Cl. 74—230.17)

The present invention relates to V pulleys of the kind wherein the pulley is formed of two half pulleys capable of being moved towards and away from one another to increase or decrease the ratio of the drive to or from said V pulley.

It is an object of the present invention to provide an improved V pulley which may be mounted directly on to the driven shaft of a machine.

It is a further object of the invention to provide an improved V pulley which may be conveniently operated at a position remote from the pulley.

According to one aspect of the present invention a variable speed V pulley comprises a first half pulley, a second half pulley concentric with said first half pulley, means to prevent relative rotation of said half pulleys, means to enable one of said half pulleys to move axially relative to the other and locking means operable to prevent said relative axial movement.

According to another aspect of the present invention there is provided in a variable speed V pulley a shaft, a first half pulley, means for mounting said first half pulley rigidly on said shaft, a second half pulley, means for mounting said second half pulley concentrically with and adjacent to said first half pulley to be rotatable with said shaft and axially slidable relative thereto, an externally threaded inner sleeve freely rotatable on said shaft an internally threaded outer sleeve screwed on said inner sleeve brake means for retarding the rotation relative to the shaft of at least one of said sleeves to cause axial movement of at least one of said sleeves relative to the shaft coupling means between one of said sleeves and said second half pulley so that said axial movement of said one sleeve causes corresponding axial movement of said second half pulley relative to said first half pulley and locking means between said sleeves and said shaft.

So that the invention may be clearly understood several embodiments will now be described reference being made to the accompanying drawings in which:

Fig. 1 is a longitudinal cross-section through one embodiment of the invention,

Fig. 2 is a perspective view of the inner brake sleeve of Fig. 1,

Fig. 3 is a perspective view of the outer brake sleeve of Fig. 1,

Fig. 4 is a perspective view of the brake drum of Fig. 1,

Fig. 5 is a longitudinal cross-section of another embodiment of the invention,

Fig. 6 is a cross-section on the line VI—VI of Fig. 5,

Fig. 7 is a cross-section on the line VII—VII of Fig. 5.

Referring to Fig. 1 a first half pulley **1*a* is rigidly mounted on a shaft 2 and is formed with a boss 3 extending axially of the shaft 2. A second half pulley 1*b* formed with a boss 5 extending axially of the shaft 2 is mounted on the boss 3 and is axially slidable therealong. A spring 4 is located concentrically on boss 3 and is held under compression between shoulders 3*a* and 5*a*** formed on bosses 3 and 5 respectively. The second half pulley **1*b* is prevented from rotating about the boss 3 by means of a key 6 located in a keyway 7 formed in the boss 3. An externally threaded inner brake sleeve 8 is rotatably mounted on the shaft 2 with its inner end abutting against the boss 3 and is retained in position by a collar 9 rigidly attached to the shaft 2 towards its outer end. Collars 10 and 11 are rigidly attached respectively to the ends of the threaded portion of the inner brake sleeve 8 (see Fig. 2) and are each provided with stops 12. Collar 10 forms a bearing on which a brake disc or drum 13 may rotate freely. Located immediately adjacent brake drum 13 is a second brake disc or drum 14 rigidly mounted on the outer end portion of the inner brake sleeve 8 and caused to rotate with the shaft 2 by means of a cover 15 secured to the brake drum 14 by bolts 16, and engaging a friction surface 17 located on the outer end face of the collar 9. A washer 18 located between the cover 15 and the brake drum 14 permits the bolts 16 to be tightened to increase the pressure on the friction surface 17**.

An internally threaded outer brake sleeve 19 having stops 12 at each end is screwed on to the inner brake sleeve 8. The outer brake sleeve 19 is provided with a flange 20 which abuts against the boss 5 of the half pulley **1*b*. The outer brake sleeve 19 is caused to rotate with the half pulley 1*b* by means of a friction device comprising a cover 21 attached by bolts 22 and washer 23 to the half pulley 1*b*, and a friction surface 24 as described in connection with brake drum 14. The outer brake sleeve 19 is also provided with keys 25 capable of engaging in keyways 26 formed internally of a boss 27 which is formed integrally with the brake drum 13**.

Brake bands or shoes 28 and 29 are capable of being moved to engage respectively with brake drums 13 and 14.

The shaft 2 may be either a driven shaft or a driving shaft. Assuming that it is a driving shaft the invention is used to transmit power by means of V belt **1*c* to a second pulley located on a driven shaft mounted with its axis parallel with the axis of shaft 2**.

In operation, to increase the speed of rotation of the driven shaft, the brake 29 is moved into contact with the brake drum 14. Slip occurs at the friction surface 17 so that the brake drum 14 and the inner brake sleeve 8 attached to it rotate at a slower speed than the shaft 2. The half pulley **1*b* since it is keyed to the half pulley 1*a* which is itself attached to the shaft 2, rotates at the same speed as the shaft 2 and maintains the speed of rotation of the outer brake sleeve 19 at substantially the same magnitude by means of the friction surface 24. As the inner and outer brake sleeves 8 and 19 are rotating at different speeds the outer brake sleeve 19 is screwed along the inner brake sleeve 8 so that the flange 20 forces the half pulley 1*b* towards the half pulley 1*a* assisted by the spring 4. The V belt 1*c* located between the half pulleys 1*a*, 1*b* moves radially outwardly so that its speed is increased to increase the speed of the driven pulley. When the desired new speed is reached the brake 29 is released. Slip no longer occurs at the friction surface 17 and the brake drum 14 and the inner brake sleeve 8 rotate at the same speed as the shaft 2. Thus no relative movement occurs between the brake sleeves 8 and 19** and the speed of the driven pulley remains constant at its new value.

To decrease the speed of the driven pulley the brake 28 is applied to brake drum 13 and since the keys 25 of the outer brake sleeve 19 are engaged in the keyways 26 of the boss 27, the outer brake sleeve 19 also rotates at reduced speed, slip occurring at friction surface 24. Since the inner brake sleeve 8 continues to rotate at the speed of the shaft 2 the difference in speeds between the inner and outer sleeves 8 and 19 causes the outer sleeve 19 to move along the inner sleeve 8. The half pulley 1*b* is therefore moved away from half pulley 1*a* by the flange 20 engaging with the cover 21 and the V belt 1*c* moves radially inwardly so that its speed and that of the driven pulley is reduced.

It will be appreciated that a change of speed may similarly be effected if the shaft 2 is a driven shaft. In order to accommodate the change in effective length of the V belt 1*c* during speed adjustment, the shaft 2 and its associated shaft may be mounted to be movable towards and away from one another under the control of resilient means or the pulley to which the V belt 1*c* is coupled may itself be a variable speed pulley of known type, wherein the two half pulleys are urged together by spring means.

In an embodiment shown in Figs. 5, 6 and 7 the collar 10 is formed integrally with the inner brake sleeve 8 and forms a bearing on which the brake drum 14 may rotate freely through a small angle. Further relative movement is checked by means of a pin 30 attached to a flange 31 formed integrally with the collar 10, engaging in a slot 32 in the brake drum 14. A spring 33 attached at one end to the pin 30 and at its other end to a pin 34 located on an inner wall of the brake drum 14 returns the brake drum 14 to its initial position after displacement. A pivot pin 35 located on the flange 31 projects outwardly away from the brake drum 14 and provides a pivot for a catch or pawl 36. The pawl 36 engages at its lower end 37 in serrations 38 formed on the collar 9 so that the brake drum 14 is locked to rotate with the shaft 2. A pin 39 extending outwardly away from the brake drum 14 is located to engage with the upper end 40 of the pawl 36 when the brake drum 14 rotates through its permitted angle to disengage the end 37 of the pawl 36 from the serrations 38 so that the inner brake sleeve 8 may rotate relative to the shaft 2. A spring 41 between the pawl 36 and a stud 42 causes the pawl 36 to be re-engaged with the serrations 38 when the pin 39 disengages from the end 40 of the pawl 36.

The brake drum 13 is mounted on the outer brake sleeve 19 in a manner similar to that described for brake drum 14 and engages with the boss 5 of half pulley 1*b* through similar components 35, 36, 38, 39. A pin 43 screw-threaded over a portion of its length is screwed into an appropriately threaded aperture in the boss 5. The unthreaded portion of the pin 43 extends radially inwardly of the boss 5 to slidably engage in an annular groove 44 formed in the outer brake sleeve 19 so that axial movement of the outer brake sleeve 19 causes corresponding movement of the boss 5 and its half pulley 1*b*.

In operation, to increase the speed of the belt 1*c* the brake 28 is applied to the brake drum 13 which causes it to move through a few degrees relative to the outer brake sleeve 19 (assuming that the shaft 2 as viewed in Fig. 6 is rotating in a clockwise direction). This relative movement causes the pin 39 to engage with the pawl 36 releasing it from the serrations 38 on the boss 5 so that the outer brake sleeve 19 can rotate independently of the shaft 2 and half pulley 1*b*. Due to the retarding action of the brake 28 the outer brake sleeve 19 rotates more slowly than the inner brake sleeve 8 so that relative screwing motion occurs between them. The outer brake sleeve 19 is forced against the boss 5 of the half pulley 1*b* moving the latter towards half pulley 1*a* thus forcing the V belt 1*c* radially outwards. When the desired speed is reached the brake 28 is released and the brake drum 13 returns to its original position under the action of spring 33 and the pawl 36 re-engages in the serrations 38 under the action of the spring 41. The outer brake sleeve 19 is then locked to rotate with the shaft 2 and the speed of the V belt 1*c* remains constant.

To decrease the speed of the belt 1*c* the brake 29 is applied to the brake drum 14 when, in a similar manner to that described above, the inner brake sleeve 8 is constrained to rotate at a reduced speed. The outer brake sleeve 19 now moves away from the boss 3 on the half pulley 1*a* and the interconnection 43, 44 between the outer brake sleeve 19 and the boss 5 causes the half pulley 1*b* to move away from half pulley 1*a*. On releasing the brake 29 when the desired speed is reached the inner sleeve 8 is again locked to shaft 2 and the speed then remains constant.

What I claim is:

1. A variable speed V pulley for causing motion of a driving member to produce motion of a driven member against the retarding effect of a load, one of said members being a V belt and the other a rotatable shaft, comprising a first half pulley rigidly mounted on said shaft, a boss integral with said first half pulley, a second half pulley mounted on said boss to define between said second half pulley and said first half pulley a V groove in which said belt may engage, a connection between said pulley halves constraining them to rotate in unison but permitting the second half pulley to vary in axial spacing from the first half pulley in either of two opposed senses, one sense corresponding to an increase in the maximum width of said groove and the other sense corresponding to a reduction in the maximum width of said groove, said connection including a first sleeve mounted on said shaft for rotation independently of said shaft and said pulley halves, means secured to said shaft for preventing axial displacement of said first sleeve relative to said shaft, a second sleeve mounted concentrically with and movable axially in relation to said first sleeve, means normally operative to cause said first sleeve to rotate with said shaft but capable of being rendered inoperative by retardation of said first sleeve relative to said shaft, means normally operative to cause said second sleeve to rotate with said shaft but capable of being rendered inoperative by retardation of said second sleeve relative to said shaft, a connection between said second sleeve and said second half pulley constraining said half pulley to follow the axial movements of said sleeve, a connection between said sleeves constraining said second half pulley to vary in axial spacing from said first half pulley in one of said senses upon rotation of said sleeves relative to each other in one direction and in the other of said senses upon rotation of said sleeves relative to each other in a direction opposed to said one direction, a first brake operable to retard the rotation of said first sleeve and a second brake operable to retard the rotation of said second sleeve.

2. A variable speed V pulley according to claim 1, wherein said connection between said sleeves comprises inter-engaging screwthreads.

3. A variable speed V pulley according to claim 2 wherein each of the means normally operative to cause one of said sleeves to rotate with said shaft comprises a friction drive.

4. A variable speed V pulley for causing motion of a driving member to produce motion of a driven member against the retarding effect of a load, one of said members being a V belt and the other a rotatable shaft, comprising a first half pulley rigidly mounted on said shaft, a second half pulley operatively supported on said shaft to define between said first half pulley and said second half pulley a V groove in which said belt may engage, a connection between said shaft and said second half pulley constraining them to rotate in unison but permitting the second half pulley to vary in axial spacing from the first half pulley in either of two opposed senses, one sense corresponding to an increase in the maximum width of said groove and the other sense corresponding to a reduction in the maximum width of said groove, said connection including a first sleeve mounted on said shaft for rotation independently of said shaft and said pulley halves, means secured to said shaft for preventing axial displacement of said first sleeve relative to said shaft, a second sleeve mounted concentrically with and movable axially in relation to said first sleeve, means normally operative to cause said first sleeve to rotate with said shaft but capable of being rendered inoperative by retardation of said first sleeve relative to said shaft, means normally operative to cause said second sleeve to rotate with said shaft but capable of being rendered inoperative by retardation of said second sleeve relative to said shaft, a connection between said second sleeve and said second half pulley constraining said half pulley to follow the axial movements of said sleeve, a connection between said sleeves constraining said second half pulley to vary in axial spacing from said first half pulley in one of said senses upon rotation of said sleeves relative to each other in one direction and in the other of said senses upon rotation of said sleeves relative to each other in a direction opposed to said one direction, a first brake operable to retard the rotation of said first sleeve and a second brake operable to retard the rotation of said second sleeve.

References Cited in the file of this patent

UNITED STATES PATENTS 1,112,345 Philipson ---------------- Sept. 29, 1914

FOREIGN PATENTS 99,173 Sweden ---------------- June 18, 1940